United States Patent [19]
Dean et al.

[11] Patent Number: 5,716,503
[45] Date of Patent: Feb. 10, 1998

[54] CENTER POST ELECTROCHEMICAL CELL STACK

[75] Inventors: W. Clark Dean, Simsbury; David L. Faye, East Hartland, both of Conn.

[73] Assignee: United Technologies Corporation, Hartford, Conn.

[21] Appl. No.: 688,894

[22] Filed: Jul. 31, 1996

[51] Int. Cl.$^6$ .................................................. C25B 9/00
[52] U.S. Cl. ..................... 204/270; 204/277; 204/278; 204/279
[58] Field of Search ..................... 204/267, 268, 204/269, 270, 277, 278, 242, 279

[56] References Cited

U.S. PATENT DOCUMENTS

| | | | |
|---|---|---|---|
| 1,701,346 | 2/1929 | Thomas . | |
| 1,799,116 | 3/1931 | Noeggerath . | |
| 3,649,508 | 3/1972 | Yokota et al. | 204/212 |
| 3,962,065 | 6/1976 | Scoville | 204/256 |
| 4,026,782 | 5/1977 | Bouy et al. | 204/254 |
| 4,339,324 | 7/1982 | Haas | 204/270 |
| 4,422,919 | 12/1983 | Fabian et al. | 204/270 |
| 4,728,585 | 3/1988 | Briggs | 204/270 X |
| 5,292,405 | 3/1994 | Wicks | 204/268 |
| 5,340,457 | 8/1994 | Ford et al. | 204/252 |
| 5,439,576 | 8/1995 | Schoeberl | 204/269 X |
| 5,466,354 | 11/1995 | Leonida et al. | 204/269 X |

Primary Examiner—Donald R. Valentine
Attorney, Agent, or Firm—Malcolm J. Chisholm, Jr.

[57] ABSTRACT

A center post electrochemical cell stack is disclosed for generating a product gas such as oxygen gas from a supply fluid such as water. The invention could be used to generate oxygen on board a space or aircraft and includes: a frame having a base plate and a wall affixed to the base plate so that the wall and base plate define a cell chamber for housing at least one electrochemical cell; and a T-cap having a top plate and a center post affixed to and projecting away from the top plate, wherein the top plate is secured to the wall of the frame to close the cell chamber and the center post passes through a central throughbore in an electrochemical cell within the chamber and is adjustably secured to the base plate of the frame. Consequently, the T-cap and frame cooperate to contain pressure generated by operation of the electrochemical cell. In a specific embodiment of the center post electrochemical cell stack, an exterior surface of the center post of the T-cap cooperates with a central throughbore vented electrochemical cell to define a high pressure manifold for venting of the product gas out of the cell, and an interior surface of the wall of the frame cooperates with the vented central throughbore cell to define a low pressure manifold for transmission of the supply fluid into and out of the cell.

20 Claims, 5 Drawing Sheets

CENTER POST ELECTROCHEMICAL CELL STACK

TECHNICAL FIELD

The present invention relates to electrochemical cell stacks for electrolyzing substances, and especially relates to high pressure electrochemical cell stacks for producing oxygen gas from water for use in air and space craft.

BACKGROUND OF THE INVENTION

Electrochemical cell stacks are commonly used for producing product gases from a supply such as water, and may also be used in "fuel cell" configurations to produce electrical energy from gaseous supply fuels. Such electrochemical cell stacks typically include a plurality of disk-shaped electrochemical cells arranged in vertical stacks and surrounded by a frame that contains pressure generated by the cells during operation.

A common use of an electrochemical cell stack is to produce oxygen and hydrogen gas from water. The oxygen gas may be used for breathing, for example in a submarine or space craft, while the hydrogen may be used as a propellant in an engine. Storage efficiencies of gases generated by electrochemical cell stacks increase with increased internal operating pressures. As internal operating pressures increase, however, structural characteristics of the stack and of individual electrochemical cells must contain substantial pressure differentials without damage. In a traditional working environment of electrochemical cell stacks such as a submarine, internal pressure differentials have been contained by large, heavy frame components typically including thick, metal end plates at opposed ends of a cell stack, and a plurality of large bolts passing between the end plates and surrounding the cell stack. The bolts are adjusted to apply a pressure preload to the stack to compress gaskets and seals between and within individual cells.

A particular demand for use of electrochemical cell stacks has arisen in producing oxygen gas onboard modern, commercial aircraft. For example, in the event of an emergency, such as an unexpected de-pressurization at a high altitude, oxygen masks automatically descend to provide passengers with oxygen. The oxygen is typically stored onboard the air craft in metal bottles, and the bottles are routinely topped off while the aircraft is being serviced. An electrochemical cell stack onboard the aircraft can be used to top off the bottles thereby saving the time and cost expense of servicing on the ground, and such a cell stack can provide oxygen for other, diverse circumstances. Efficient generation of oxygen gas in such a working environment requires that the electrochemical cell stack be operated with an internal pressure differential within the stack and within individual cells of the stack of approximately 2,000 pounds per square inch (hereafter "p.s.i.") Known electrochemical cell stacks having such an operating capacity however require large, heavy frame components, and are subject to high risks of leakage of gases.

Accordingly it is the general object of the present invention to overcome the size, weight and leakage risk problems of prior art electrochemical cell stacks.

It is a more specific object to provide an electrochemical cell stack capable of operating with internal pressures of approximately 2,000 p.s.i. without large, heavy frame components.

It is another specific object to provide an electrochemical cell stack with enhanced sealing characteristics under internal operating pressures of approximately 2,000 p.s.i.

The above and other advantages of this invention will become more readily apparent when the following description is read in conjunction with the accompanying drawings.

SUMMARY OF THE INVENTION

A center post electrochemical cell stack is disclosed for generating a product gas such as oxygen gas from a supply fluid such as water. In a particular embodiment, the invention includes a frame having a base plate and a wall affixed to the base plate so that the wall and base plate define a cell chamber for housing at least one electrochemical cell; and a T-cap having a top plate and a center post affixed to and projecting away from the top plate, wherein the top plate is dimensioned to be adjustably secured to the wall of the frame to close the cell chamber and the center post is dimensioned to pass through a central throughbore in an electrochemical cell within the chamber and to be adjustably secured to the base plate of the frame so that the T-cap and frame cooperate to contain pressure generated by operation of the electrochemical cell.

In a preferred embodiment of the center post electrochemical cell stack, an exterior surface of the center post of the T-cap cooperates with a central throughbore vented electrochemical cell to define a high pressure manifold for venting of the product gas out of the cell, and an interior surface of the wall of the frame cooperates with the vented central throughbore cell to define a low pressure manifold for transmission of the supply fluid into and out of the cell.

The central throughbore vented cell includes: a high pressure channelled spacer in fluid communication with the high pressure manifold and a low pressure channelled spacer in fluid communication with the low pressure manifold, so that the supply fluid moves through the low pressure channelled spacer into contact with electrolysis components of the cell where it is electrolyzed and the resulting product gas such as oxygen passes out of the cell through the high pressure channelled spacer and high pressure manifold; a central O-ring seal and a central retainer ring that surround the high pressure manifold so that high pressure gas in the manifold cannot pass through the central O-ring seal into a low pressure side of the cell and deformation of the central O-ring seal under high pressure from the gas is restrained by the central retainer ring; and an outer O-ring seal and outer retainer ring that surround the cell adjacent to the low pressure manifold so that deformation of the outer O-ring seal under high pressure from the gas is restrained by the outer retainer ring, and the high pressure gas within a high pressure side of the cell cannot pass through the outer O-ring seal into the low pressure manifold. Support surfaces of the channelled spacers and retainer rings cooperate to prohibit deformation of cell components under high operating pressures.

In use of the center post electrochemical cell stack, the top plate and center post of the T-cap are adjustably secured to the frame, for example by threaded screw mechanisms, so that axial movement of the T-cap to an operational position within the frame serves to compress the central and outer O-rings of each central throughbore vented cell, and to preload electrode springs within the high pressure sides of the cells so that adjacent cells move into electrical contact with each other. The center post, top plate, base plate and walls thereby serve to efficiently contain pressure within the cell chamber, while the central and outer O-ring seals prohibit movement of the high pressure gas into low pressure sides of the cells, and the central and outer retainer rings restrain deformation of the O-ring seals.

DESCRIPTION OF THE PREFERRED EMBODIMENTS

Figure 1:
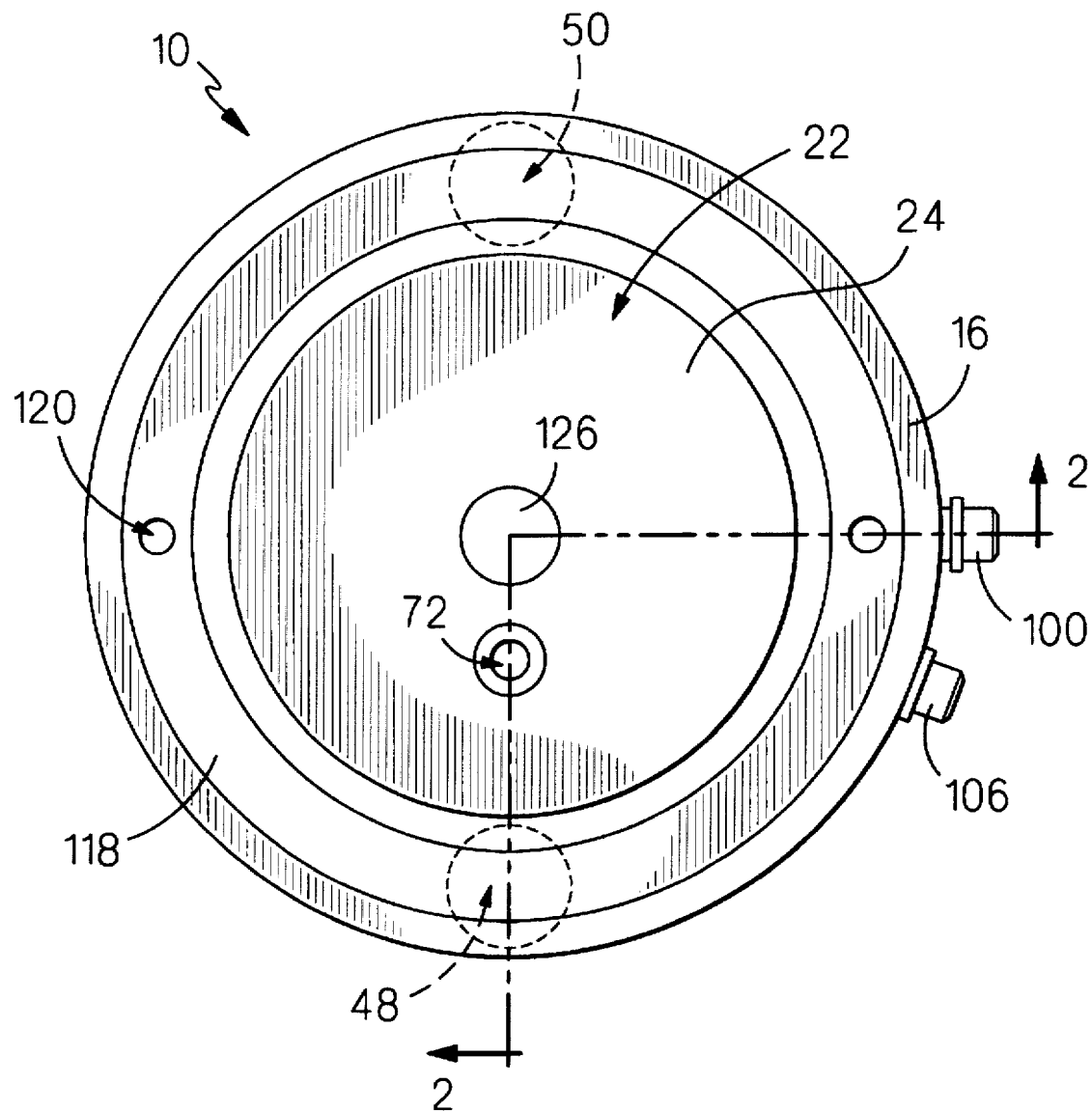
FIG. 1 is a top plan view of a center post electrochemical cell stack constructed in accordance with the present invention showing a top plate of a T-cap positioned over a frame of the stack.
Figure 2:
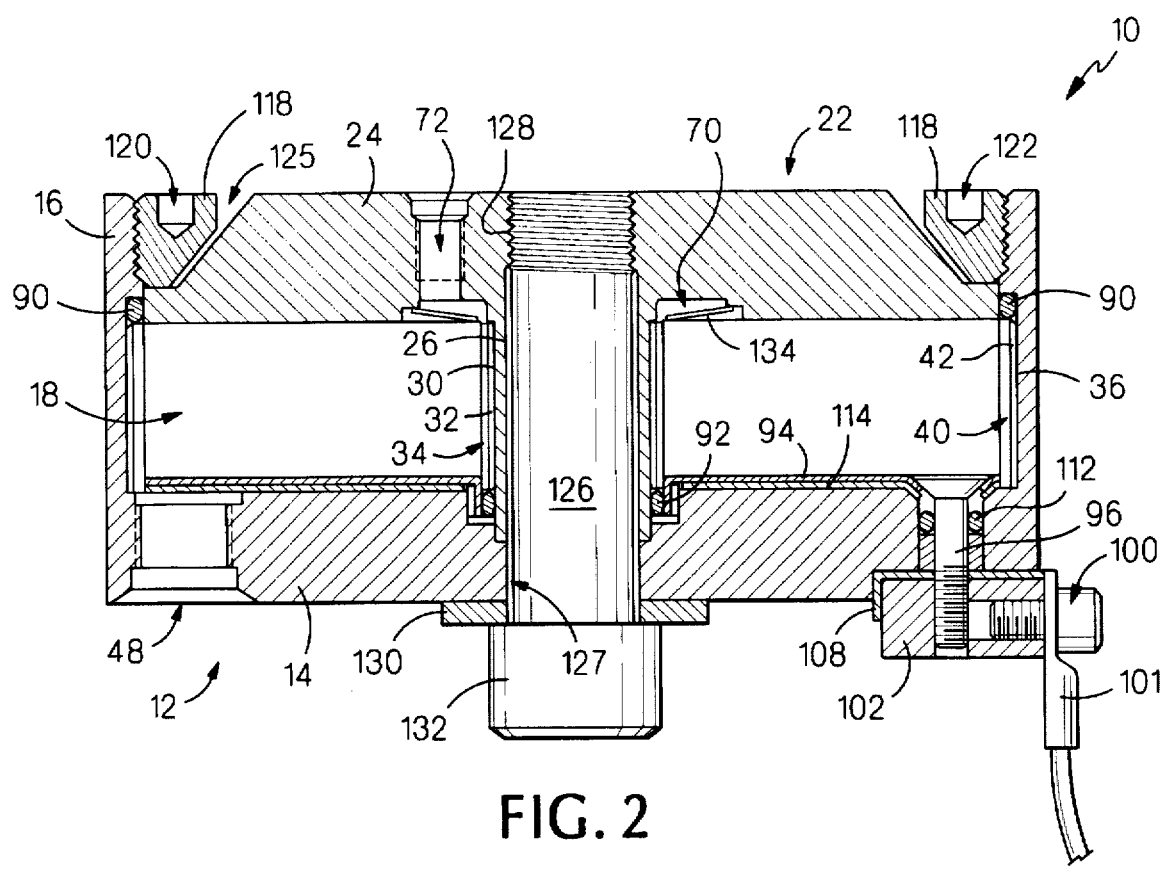
FIG. 2 is a sectional view of the FIG. 1 center post electrochemical cell stack taken along sight line 2—2 seen in FIG. 1.
Figure 3:
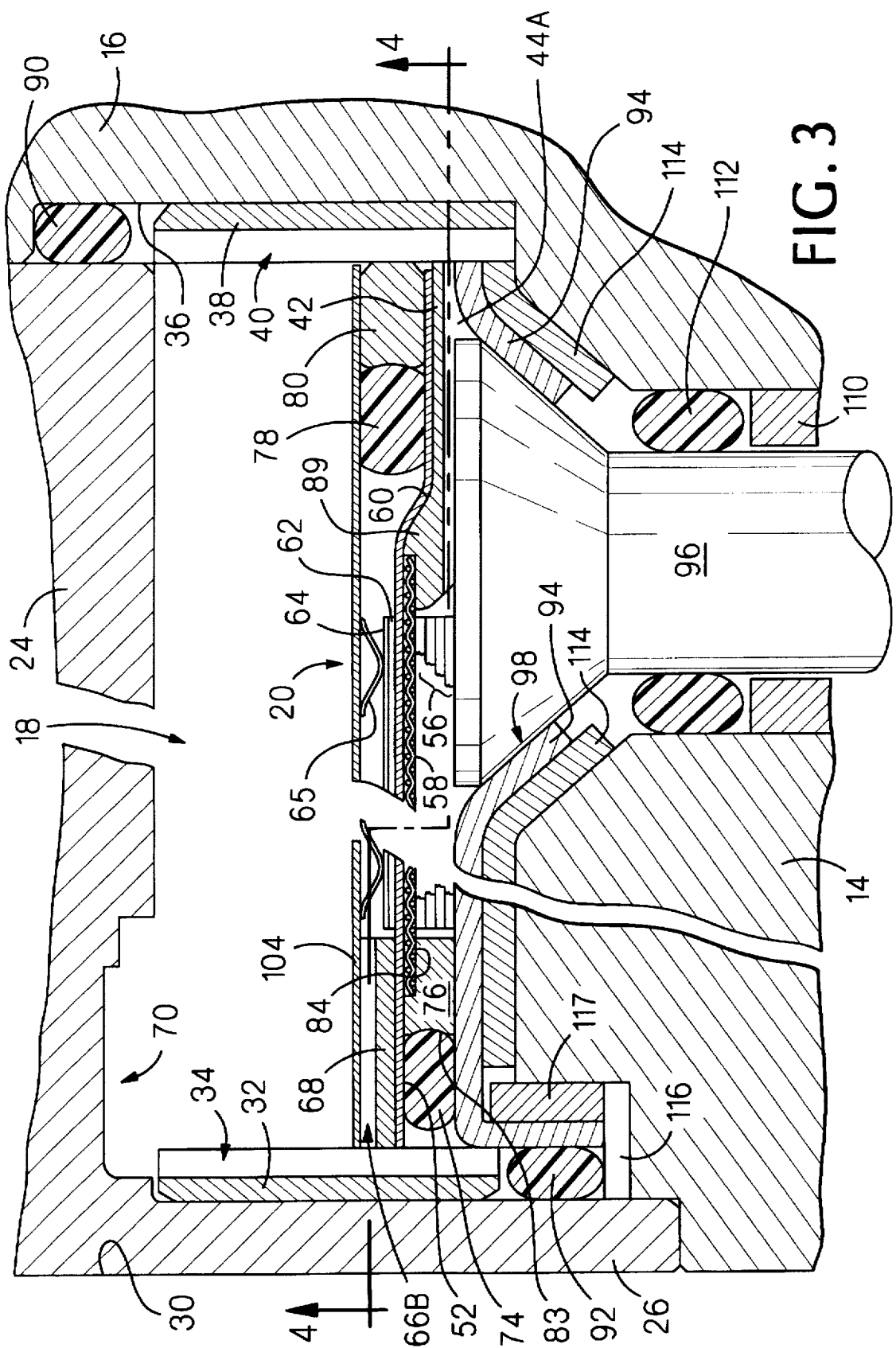
FIG. 3 is a fragmentary sectional view of the FIG. 1 center post electrochemical cell stack showing cell components and low and high pressure manifolds.

Referring to the drawings in detail, a center post electrochemical cell stack of the present invention is shown and generally designated by the reference numeral 10. As best seen in FIGS. 1–3, the center post electrochemical cell stack 10 includes: a frame 12 having a base plate 14 and a wall 16 affixed to the base plate 14 so that the wall 16 and base plate 14 define a cell chamber 18 for housing at least one electrochemical cell 20 (best seen in FIG. 3); and a T-cap 22 having a top plate 24 and a center post 26 affixed to and extending away from the top plate 24 toward the base plate 14, wherein the top plate 24 is dimensioned to be adjustably secured to the wall 16 of the frame to close the cell chamber 18 and the center post 26 is dimensioned to pass through a central throughbore 28 (best seen in FIG. 4) in the electrochemical cell 20 and to be adjustably secured to the base plate 14 of the frame 12 so that the T-cap 22 and frame 12 cooperate to contain pressure generated by operation of the electrochemical cells within the cell chamber 18. As seen in FIG. 3, an exterior surface 30 of the center post 26 cooperates with a high pressure insulating spacer 32 adjacent the central throughbore of the cell 20 to define a high pressure manifold 34 for venting of a product gas such as oxygen out of the cell chamber 18, and an interior surface 36 of the wall 16 of the frame 12 cooperates with a low pressure insulating spacer 38 adjacent a peripheral edge of the cell 20 to define a low pressure manifold 40 for transmission of a supply fluid such as water through the cell 20.

Figure 4:
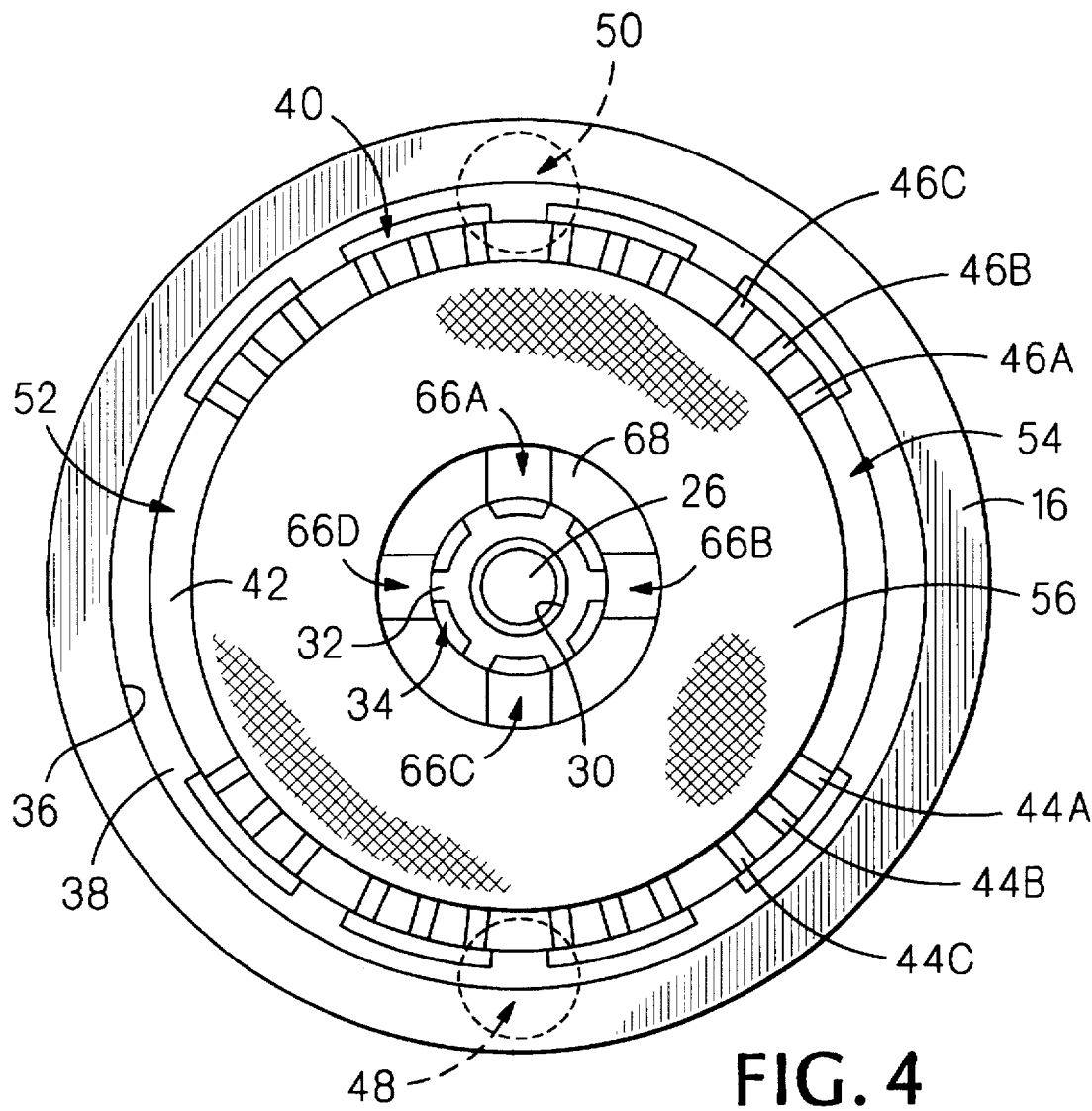
FIG. 4 is a cross-sectional view of the FIG. 1 center post electrochemical cell stack taken along sight line 4—4 seen in FIG. 3.
Figure 5:
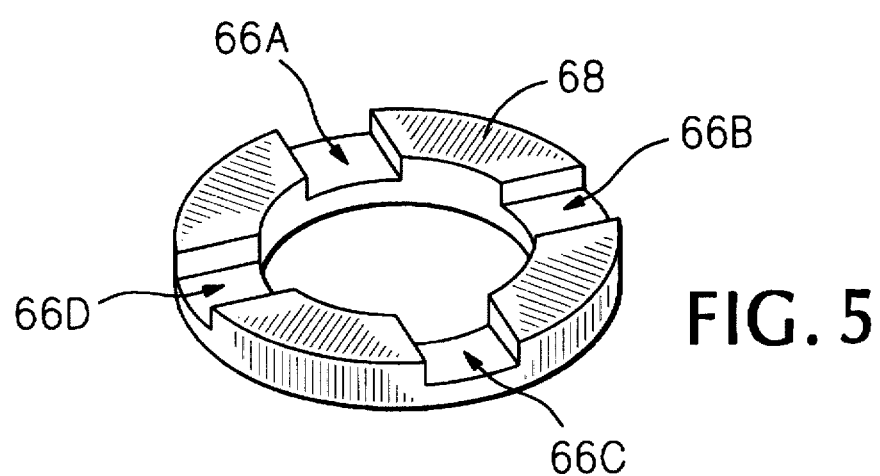
FIG. 5 is a perspective view of a high pressure channelled spacer of the FIG. 1 center post electrochemical cell stack.

A preferred embodiment of the center post electrochemical cell stack 10 includes a central throughbore vented cell means for venting product gases out of the cell means through a central throughbore of the cell, such as the central throughbore vented cell 20 shown in FIGS. 3 and 4. In such an embodiment, a central throughbore vented cell 20 includes a low pressure channelled spacer 42 defining a set of low pressure inlet channels 44A, 44B, 44C, etc. and a set of low pressure outlet channels 46A, 46B, 46C, etc. (shown in FIG. 4). As shown in FIG. 4, the low pressure channelled spacer 42 is positioned adjacent the low pressure manifold 40 so that the set of low pressure inlet channels 44A, 44B, 44C are over a supply fluid inlet 48 defined within the base plate 14, and the set of low pressure outlet channels 46A, 46B, 46C are over a supply fluid outlet 50 (shown in phantom lines in FIGS. 1 and 4). By that arrangement, the supply fluid can flow through the supply fluid inlet 48, through the low pressure manifold 40 and low pressure inlet channels 44A, 44B, 44C and into other cell 20 components (to be described hereinbelow), and then through the low pressure outlet channels 46A, 46B, 46C, low pressure manifold 40 and supply fluid outlet 50 out of the center post electrochemical cell stack 10. The low pressure channelled spacer 42 also defines a barrier means for prohibiting supply fluid from flowing directly from a low pressure inlet channel into an adjacent low pressure outlet channel so that the supply fluid must instead flow across cell components before flowing, such as a first barrier 52 and a second barrier 54 (the first and second barriers 52, 54 being seen only in FIG. 4) which are sections of the spacer 42 having no inlet or outlet channels.

After the supply fluid passes through the low pressure inlet channels 44A, 44B, 44C, etc., it flows into an area of the cell 20 containing electrolysis component means for electrolyzing a supply fluid into a product gas well-known in the art of electrochemical cells utilizing solid polymer electrolyte membranes, such as components of a high pressure electrolysis cell disclosed in U.S. Pat. No. 5,466,354 to Leonida et al. and owned by the assignee of the present invention, which patent is hereby incorporated herein by reference. The electrolysis component means consists of electrolysis components such as: a screen pack 56 of expanded metal plates adjacent the low pressure inlet 44A, 44B, 44C and outlet 46A, 46B, 46C channels; a porous plate 58 above the screen pack; a solid polymer electrolyte membrane 60 adjacent the porous plate 58, and an electrode 62 adjacent the membrane 60; a backup screen 64 adjacent the electrode 62 and a preload electrode spring 65 on the backup screen 64. Pore sizes of pores (not shown) in the porous plate are selected to prevent extrusion of the membrane 60 through the pores at the selected operating pressure differential. Spacing and orientation of the expanded metal screen pack 56 is selected to allow flow of the supply fluid while supporting a pressure load generated by the selected operating pressure differential. In a manner well-known in the art, a supply fluid such as water is electrolyzed by the electrolysis components so that a product gas such as oxygen is drawn through the solid polymer electrolyte membrane 60 and hydrogen gas remains within the supply fluid in a gaseous phase. The supply fluid remains in a low pressure side of the cell 20 that includes the low pressure inlet 44A, 44B, 44C and outlet 46A, 46B, 46C channels, the screen pack 56, and the porous plate 58. After the oxygen is drawn out of the low pressure side of the cell 20, the supply fluid with entrained hydrogen gas passes through the low pressure outlet channels 46A, 46B, 46C, etc. and out of the cell 20 through the supply fluid outlet 50.

Figure 6:
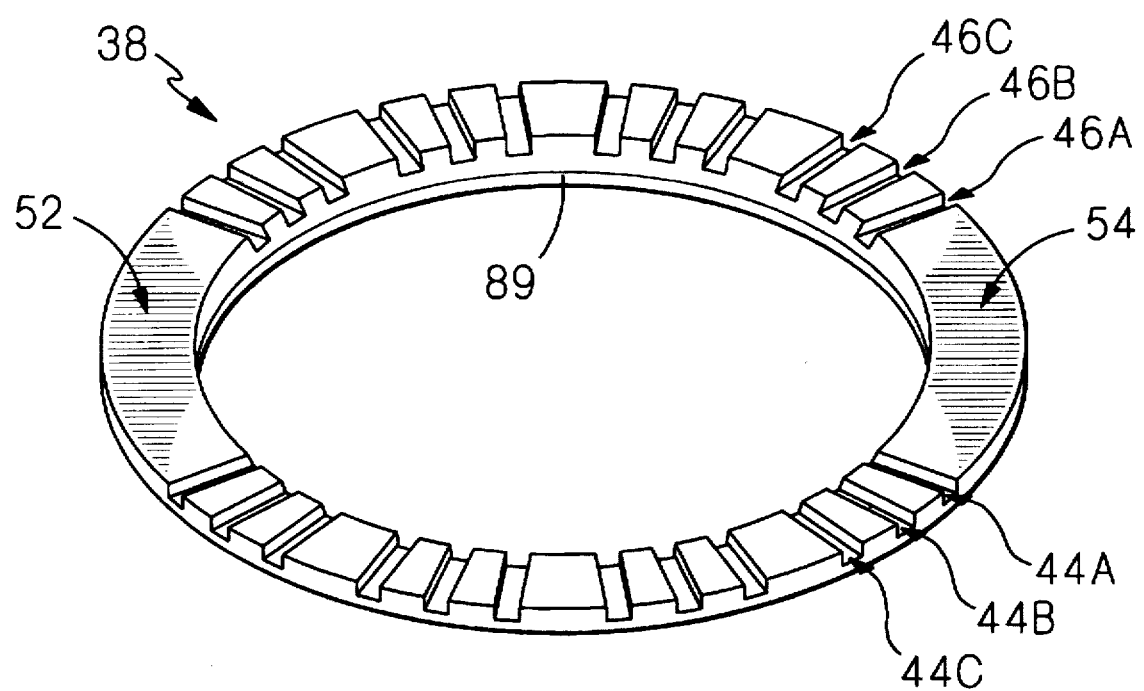
FIG. 6 is a perspective view of a low pressure channelled spacer of the FIG. 1 center post electrochemical cell stack.

The product gas passes through the electrode 62 and backup screen 64 within a high pressure side of the cell 20 that includes a porous plate top surface 59, the solid polymer electrolyte membrane 60, the electrode 62, back up screen 64, and the preload electrode spring 65. The product gas then moves into high pressure outlet channels 66A, 66B, 66C, 66D of a high pressure channelled spacer 68, as best seen in FIGS. 4 and 6. The high pressure channelled spacer 68 is also in the high pressure side of the cell 20 and is positioned between the electrode 62, backup screen 64 and the high pressure insulting spacer 32 that includes the high pressure manifold 34. The product gas can thereby flow through the high pressure outlet channels 66A, 66B, 66C, 66D and into and up the high pressure manifold 34 adjacent the center post 26 to a discharge cavity 70 in fluid communication with a product gas outlet 72, which directs the product gas out of the center post electrochemical cell stack 10.

The central throughbore a retainer 20 also includes a retainer ring seal means for providing sealing between the high and low pressure sides of the cell 20. The retainer ring seal means includes: a central O-ring seal 74, and a central retainer ring 76 that cooperatively surround the high pressure manifold 34; and an outer O-ring seal 78 and outer retainer ring 80 that cooperatively surround the low pressure manifold 40. The central O-ring seal 74 may be a standard flexible "O-ring" type of seal, and is positioned to surround the center post 26 and its adjacent high pressure manifold 34 and cooperates with the central retainer ring 76 to define a central border of the low pressure side of the cell. A top surface 82 of the central O-ring seal 74 supports a central portion of the solid polymer electrolyte 60. The central retainer ring 76 is made of a rigid material such as a metal or a ceramic material having high tensile strength properties; defines a concave central seal surface 83 that engages an outer surface of the central O-ring seal 74; and is positioned to surround the central O-ring seal 74 between it and the electrolysis components within the low pressure side of the cell, including the screen pack 56 and porous plate 58. The central O-ring 74 prevents high pressure product gases within the high pressure manifold 34 from entering the low pressure side of the cell 20, and the central retainer ring 76 provides mechanical support to the central O-ring seal 74 to prevent any deformation of the seal 74 upon exposure to a pressure differential between the high pressure manifold 34 and the low pressure side of the cell 20. The central retainer ring 76 defines a ring shoulder 84 that cooperates with spacer shoulder 86 defined within the low-pressure channelled spacer 42 to secure opposed edges of the porous plate 58 in a fixed position.

The outer O-ring seal 78 may also be a standard flexible "O-ring" and cooperates with the outer retainer ring 80 to define an outer border of the high pressure side of the cell 20. The outer retainer ring 80 is made of a rigid material such as a metal or a ceramic material having high tensile strength properties; sits on an outer portion of the solid polymer electrolyte membrane 60; defines an outer concave seal surface 88 that engages and outer surface of the outer O-ring seal 78; and is positioned adjacent the low pressure manifold 40 surrounding the outer O-ring seal 78. The seal 78 thereby prohibits high pressure product gas within the high pressure side of the cell 20 from entering the low pressure manifold 40, while the outer retainer ring 80 provides mechanical support to the outer O-ring seal 78 to prevent any deformation of the seal 78 upon exposure to a pressure differential between the high pressure side of the cell and the low pressure manifold 40. As best seen in FIG. 3, a retainer step 89 is defined in the low pressure channelled spacer 42 adjacent its central edge that also effectively provides a mechanical support to the outer O-ring seal 78 to prevent any deformation of the seal 78 away from the outer retainer ring 80 toward the electrolysis components of cell 20.

Additional sealing of the central throughbore vented cell 20 within the cell chamber 18 is provided for by a top plate seal 90 positioned to surround the top plate 24 of the T-cap 22 between it and the wall 16 of the frame, and by a center post seal 92. The center post seal 92 surrounds the exterior surface 30 of the center post 26 below the high pressure manifold 34 between the center post 26 and an electrode plate 94 adjacent bottom surfaces of the central O-ring seal 74, central retainer ring 76, screen pack 56, and low pressure channelled spacer 42, which bottom surfaces define a bottom surface of the cell 20.

The center post electrochemical cell stack 10 and the central throughbore vented cell 20 also include electrical conductivity means for passing a current through the cell 20 (best seen in FIGS. 2 and 3), such as: the electrode plate 94 adjacent the bottom surface of the cell 20; a first contact screw 96 that passes through a contact throughbore 98 in the electrode plate; a second contact screw 100 and electrcal lead 101 in contact with the first contact screw 96 within a contact block 102 secured to the frame 12; a metallic separator sheet 104 in contact with the preload electrode spring 65 adjacent a top surface of the cell 20, which top surface is defined by top surfaces of the high pressure channelled spacer 68, preload electrode spring 65, outer O-ring seal 78 and outer retainer ring 80. The metallic separator sheet 104 separates the central throughbore vented cell 20 from an adjacent additional cell (not shown), and a repeating sequence of additional cells could be stacked within the cell chamber 18 until a preload electrode spring of a cell nearest the top plate 24 contacts the top plate. A current then can flow from a source into and through second contact and first contact screws 100, 96, through the electrode plate 94 and electrolysis components of the cell 20 thereby electrolyzing the supply fluid, and through the metallic separator plate 104 to any adjacent cells, and finally into the top plate 24 and frame, and then out of the center post electrochemical cell stack 10 through a frame contact point 106.

As best seen in FIG. 3, the electrical conductivity means also includes insulating means for insulating the current from a direct route to the frame 12 prior to passing through the cell 20, such as: a block wall 108 around the contact block 102; a sleeve insulator 110 and sleeve seal 112 around the first contact screw 96; an insulating sheet 114 between the electrode plate and the base plate 14; first 116 and second 117 center post seal insulators adjacent the insulating sheet and between the center post seal 92 and base plate 14; and the high pressure insulating spacer 32 and low pressure insulating spacer 38.

The center post electrochemical cell stack 10 also includes frame plate securing means for adjustably securing the frame of the cell stack to its T-cap. The frame plate securing means may include any of a variety of mechanisms for securing caps to vessels that are to be pressurized. One such frame plate securing means shown in FIGS. 1 and 2 includes: a plate ring 118 having first and second torque points 120, 122, wherein the torque points are used to twist the plate ring 118 into threaded engagement with a helical receiving groove 124 in the wall 16 so that the plate ring rests within a ring groove 125 at a perimeter edge of the top plate 24 and secures the top plate 24 within the cell chamber 18 adjacent a top surface of a cell in the chamber; and a center bolt 126 passing through a base plate throughbore 127 and the center post 26 and engaging in a standard threaded screw engagement a threaded top plate throughbore 128, having a center bolt thrust washer 130 between a bolt head 132 of the center bolt 126 and the base plate 12. As is best seen in FIG. 3, when the top plate is adjusted by the frame plate securing means, a belville washer 134 positioned within the discharge cavity 70 to surround the center post 26 applies a compliant preload pressure to cells within the chamber 18 adjacent their central throughbores to compensate for any thickness differences within retainer ring seal means of the cells.

In use of the center post electrochemical cell stack 10, one or more central throughbore vented cells 20 are loaded into the cell chamber 18, and the T-cap is positioned so that the center post 26 passes through the central throughbore 28 of the cell 20 to be secured to the base plate 14. The T-cap moves into the cell chamber 18 to an operational position wherein the central O-ring seal 74 and outer O-ring seal 78 are compressed to enhance their sealing capacity in a manner well known in the art; the belleville washer 134 is compressed; and individual cells within the cell chamber 18 are within electrical contact with each other through the electrode plate 94, electrolysis components of the cells and their respective metallic separators 104. Additionally in the operational position, opposed support surfaces of the high pressure channelled spacer 68 and the central retainer ring 76 that underlies the spacer 68 adjacent the central throughbore 28 of the cell 20 form a first mechanical collar means for surrounding the high pressure manifold 34, and opposed support surfaces of the low pressure channelled spacer 42 and the outer retainer ring 80 that overlies the spacer 42 form a second mechanical collar means for surrounding the low pressure manifold 40. The first and second mechanical collar means define virtually mechanical pathways between the base plate 14, central throughbore vented cells 20 and top plate 24 wherein the solid polymer electrolyte membrane 60 is the only semi-rigid component in the collars. Under cell operating pressures, the first and second mechanical collar means thereby prohibit over compression of the central or outer O-ring seals 74, 78, and the first and second mechanical collar means further contain pressures generated within and between the cells 20 and thereby prohibit deformation of any other cell components.

As a supply fluid such as water moves through the supply fluid inlet 48 and passes out of the supply fluid outlet 50 with entrained hydrogen gas, the water removes heat generated by electrolysis taking place in the cells out of the center post electrochemical cell stack 10. Materials used in making the described components of the center post electrochemical cell stack, unless described above with specificity, are standard materials well known in the art.

Pressure generated by the electrolysis process within the cells is contained by the frame 12 and T-cap 22. In particular, the wall 16 and peripheral edges of the base plate 14 and end plate 24 contain pressure adjacent outer edges of the cells, and the center post 26 and central portions of the base plate 14 and top plate 24 contain pressure adjacent central throughbores of the cells. Because containment of the stack's 10 operating pressure is thereby contained by both the frame 12 and the T-cap 22, materials making up the frame and T-cap can be much thinner and lighter than frame components of traditional electrochemical cell stacks containing similar operational pressures. Additionally, the retainer ring seal means provides substantially enhanced sealing of the stack 10 under high operating pressures.

While the present invention has been described and illustrated with respect to a particular construction of a center post electrochemical cell stack, it will be understood by those skilled in the art that the present invention is not to be limited to this particular example. For example, while the description above describes electrolysis of a supply fluid into at least one separated product gas, the invention cold also be utilized in a "fuel cell" embodiment. Accordingly, reference should be made to the attached claims rather than the foregoing description to determine the scope of the invention.

Having thus described the invention, what is claimed is:

1. A center post electrochemical cell stack for generating a product gas from a supply fluid, comprising:
   a. a frame having a base plate and a wall affixed to the base plate so that the wall and base plate define a cell chamber for housing an electrochemical cell; and
   b. a T-cap having a top plate and a center post affixed to and extending away from the top plate, wherein the top plate is dimensioned to be adjustably secured to the wall of the frame to close the cell chamber and the center post is dimensioned to pass through a central throughbore in the electrochemical cell and to be adjustably secured to the base plate so that the T-cap and frame cooperate to contain pressure generated by operation of the electrochemical cell.

2. The center post electrochemical cell stack of claim 1, wherein an exterior surface of the center post cooperates with an adjacent central throughbore of the electrochemical cell to define a high pressure manifold for venting the product fluid out of the cell chamber.

3. The center post electrochemical cell stack of claim 2, wherein an interior surface of the wall cooperates with an adjacent peripheral edge of the electrochemical cell to define a low pressure manifold for transmission of the supply fluid into and out of the cell.

4. The center post electrochemical cell stack of claim 3, wherein the electrochemical cell comprises a central throughbore vented cell having a low pressure channelled spacer defining a plurality of low pressure inlets and a plurality of low pressure outlets adjacent the low pressure manifold so that the supply fluid may flow into a supply fluid inlet in fluid communication with the low pressure manifold, through the low pressure manifold, adjacent low pressure inlet channels and out of the cell through the low pressure outlet channels, the low pressure manifold and out of the cell stack through a supply fluid outlet.

5. The center post electrochemical cell stack of claim 4, wherein the central throughbore vented cell further comprises a high pressure channelled spacer that defines a plurality of high pressure outlet channels adjacent the high pressure manifold so that the product gas may pass through the high pressure outlet channels, high pressure manifold and out of the stack through a product gas outlet in fluid communication with the high pressure manifold.

6. The center post electrochemical cell stack of claim 5, wherein the central throughbore vented cell further comprises a central O-ring seal and central retainer ring that cooperatively surround a central edge of the cell adjacent the high pressure manifold to define a central border of a low pressure side of the cell so that high pressure gas in the high pressure manifold cannot enter the low pressure side of the cell, and an outer O-ring seal and outer retainer ring that cooperatively surround the peripheral edge of the cell adjacent the low pressure manifold to define an outer border of a high pressure side of the cell so that high pressure gas in the high pressure side of cell cannot enter the low pressure manifold.

7. The center post electrochemical cell stack of claim 6, further comprising a high pressure insulating spacer adjacent the exterior surface of the center post that further defines the high pressure manifold, and a low pressure insulating spacer adjacent the interior surface of the wall that further defines the low pressure manifold.

8. The center post electrochemical cell stack of claim 7 wherein opposed support surfaces of the high pressure channelled spacer and the central retainer ring underlying the high pressure channelled spacer adjacent the central throughbore of the cell form a first mechanical collar means for establishing a virtual mechanical pathway between the base plate, cell and top plate surrounding the high pressure manifold, and opposed surfaces of the low pressure channelled spacer and the outer retainer ring overlying the low pressure channelled spacer adjacent the peripheral edge of the cell form a second mechanical collar means for establishing a virtual mechanical pathway between the base plate, cell and top plate surrounding the low pressure manifold.

9. A center post electrochemical cell stack for electrolyzing a product gas from a supply fluid, comprising:

a. a frame having a base plate and a wall affixed to the base plate so that the wall and base plate define a cell chamber;

b. central throughbore vented cell means within the cell chamber for venting product gases out of the cell through a central throughbore of the cell; and c. a T-cap having a top plate and a center post affixed to and extending away from the top plate, wherein the top plate is dimensioned to be adjustably secured to the wall of the frame to close the cell chamber and the center post is dimensioned to pass through the central throughbore in the central throughbore vented cell means and to be adjustably secured to the base plate so that the T-cap and frame cooperate to contain pressure generated by operation of the electrochemical cell.

10. The center post electrochemical cell stack of claim 9, wherein the central throughbore vented cell means further comprises electrolysis component means for electrolyzing the supply fluid into a product gas.

11. The center post electrochemical cell stack of claim 10, wherein the central throughbore vented cell means also includes a retainer ring seal means for providing sealing between high and low pressure sides of the cells.

12. The center post electrochemical cell stack of claim 11, wherein the stack and the central throughbore vented cell means also include electrical conductivity means for passing a current through the cell means and insulating means for insulating the current from a direct route from a source of the current to the frame prior to passing through the cell means.

13. The center post electrochemical cell stack of claim 9, wherein an exterior surface of the center post cooperates with the adjacent central throughbore of the central throughbore vented cell means to define a high pressure manifold for venting the product fluid out of the cell chamber, and an interior surface of the wall cooperates with an adjacent peripheral edge of the cell to define a low pressure manifold for transmission of the supply fluid into and out of the cell.

14. The center post electrochemical cell stack of claim 9, further comprising a high pressure insulating spacer adjacent an exterior surface of the center post that defines a high pressure manifold for venting the product fluid out of the cell chamber, and a low pressure insulating spacer adjacent the interior surface of the wall that defines a low pressure manifold for transmission of the supply fluid into and out of the cell.

15. The center post electrochemical cell stack of claim 9, further comprising a frame plate securing means for adjustably securing the frame of the cell stack to the T-cap.

16. A center post electrochemical cell stack for generating a product gas from a supply fluid, comprising:

a. a frame having a base plate and a wall affixed to the base plate so that the wall and base plate define a cell chamber for housing an electrochemical cell;

b. a T-cap having a top plate and a center post affixed to and extending away from the top plate, wherein the top plate is dimensioned to be adjustably secured to the wall of the frame to close the cell chamber and the center post is dimensioned to pass through a central throughbore in the electrochemical cell and to be adjustably secured to the base plate so that the T-cap and frame cooperate to contain pressure generated by operation of the electrochemical cell; and c. electrical conductivity means for passing a current through the electrochemical cell and insulating means for insulating the current from a direct route from a source of the current to the frame prior to passing through the electrochemical cell.

17. The center post electrochemical cell stack of claim 16, wherein the electrochemical cell includes a central 0-ring seal and central retainer ring that cooperatively surround a central edge of the cell adjacent a high pressure manifold to define a central border of a low pressure side of the cell so that high pressure gas in the high pressure manifold cannot enter the low pressure side of the cell, and an outer O-ring seal and outer retainer ring that cooperatively surround a peripheral edge of the cell adjacent a low pressure manifold do define an outer border of a high pressure side of the cell so that high pressure gas in the high pressure side of the cell cannot enter the low pressure manifold.

18. The center post electrochemical cell stack of claim 16, further comprising a high pressure insulating spacer adjacent an exterior surface of the center post that defines a high pressure manifold for venting the product fluid out of the cell chamber, and a low pressure insulating spacer adjacent the interior surface of the wall that defines a low pressure manifold for transmission of the supply fluid into and out of the cell.

19. The center post electrochemical cell stack of claim 16, wherein the electrochemical cell includes a low pressure channelled spacer defining a plurality of low pressure inlets and a plurality of low pressure outlets adjacent a low pressure manifold defined between an interior surface of the wall and a peripheral edge of the cell so that the supply fluid may flow into a supply fluid inlet in fluid communication with the low pressure manifold, through the low pressure manifold, adjacent low pressure inlet channels and out of the cell through the low pressure outlet channels, the low pressure manifold and out of the cell stack through a supply fluid outlet, and the cell further includes a high pressure channelled spacer that defines a plurality of high pressure outlet channels adjacent a high pressure manifold defined between an exterior surface of the center post and the central throughbore of the cell so that the product gas may pass through the high pressure outlet channels, high pressure manifold and out of the stack through a product gas outlet in fluid communication with the high pressure manifold.

20. The center post electrochemical cell stack of claim 19, wherein the low pressure channelled spacer defines a barrier means for prohibiting supply fluid from flowing directly from a low pressure inlet channel into an adjacent low pressure outlet channel.

* * * * *